United States Patent [19]

Dethloff

[11] 4,176,019
[45] Nov. 27, 1979

[54] PROCESS AND APPARATUS FOR TREATMENT OF WASTE GASES

[75] Inventor: Finn H. Dethloff, Oslo, Norway

[73] Assignees: Ardal og Sunndal Verk a.s., Oslo, Norway; Alcan Research and Development Limited, Montreal, Canada

[21] Appl. No.: 885,209

[22] Filed: Mar. 10, 1978

[30] Foreign Application Priority Data

Mar. 10, 1977 [GB] United Kingdom ............... 10212/77

[51] Int. Cl.² ........................ B04C 3/06; B01D 53/06; B01J 8/14; C25C 3/06
[52] U.S. Cl. ........................ 204/67; 204/247; 204/266; 422/145; 55/71; 55/79; 34/12; 34/57 E; 34/168
[58] Field of Search ................. 204/67, 247, 266, 270; 23/288 S, 288 G; 55/71, 79, 390; 34/11, 12, 57 E, 168

[56] References Cited

U.S. PATENT DOCUMENTS

| 3,992,176 | 11/1976 | Bohne et al. | 55/79 |
| 4,053,375 | 10/1977 | Roberts et al. | 204/67 |
| 4,089,119 | 5/1978 | Heinze | 34/57 E |

FOREIGN PATENT DOCUMENTS

| 285038 | 5/1929 | United Kingdom . | |
| 1225895 | 3/1971 | United Kingdom | 204/67 |
| 1375476 | 11/1974 | United Kingdom | 204/67 |
| 1455149 | 11/1976 | United Kingdom . | |
| 1487513 | 10/1977 | United Kingdom . | |

*Primary Examiner*—Howard S. Williams
*Attorney, Agent, or Firm*—Cooper, Dunham, Clark, Griffin & Moran

[57] ABSTRACT

In the scrubbing of gases containing sorbable contaminants, particularly the waste gases from reduction cells for electrolytic production of aluminium the waste gas is injected tangentially into the bottom of a cylindrical chamber, from which it is withdrawn through an axial outlet passage at the top end. A solid sorbent material is introduced into the chamber at one or more positions at the top end of the chamber in such a way that it enters the ascending gas stream in a peripheral zone of the chamber.

25 Claims, 6 Drawing Figures

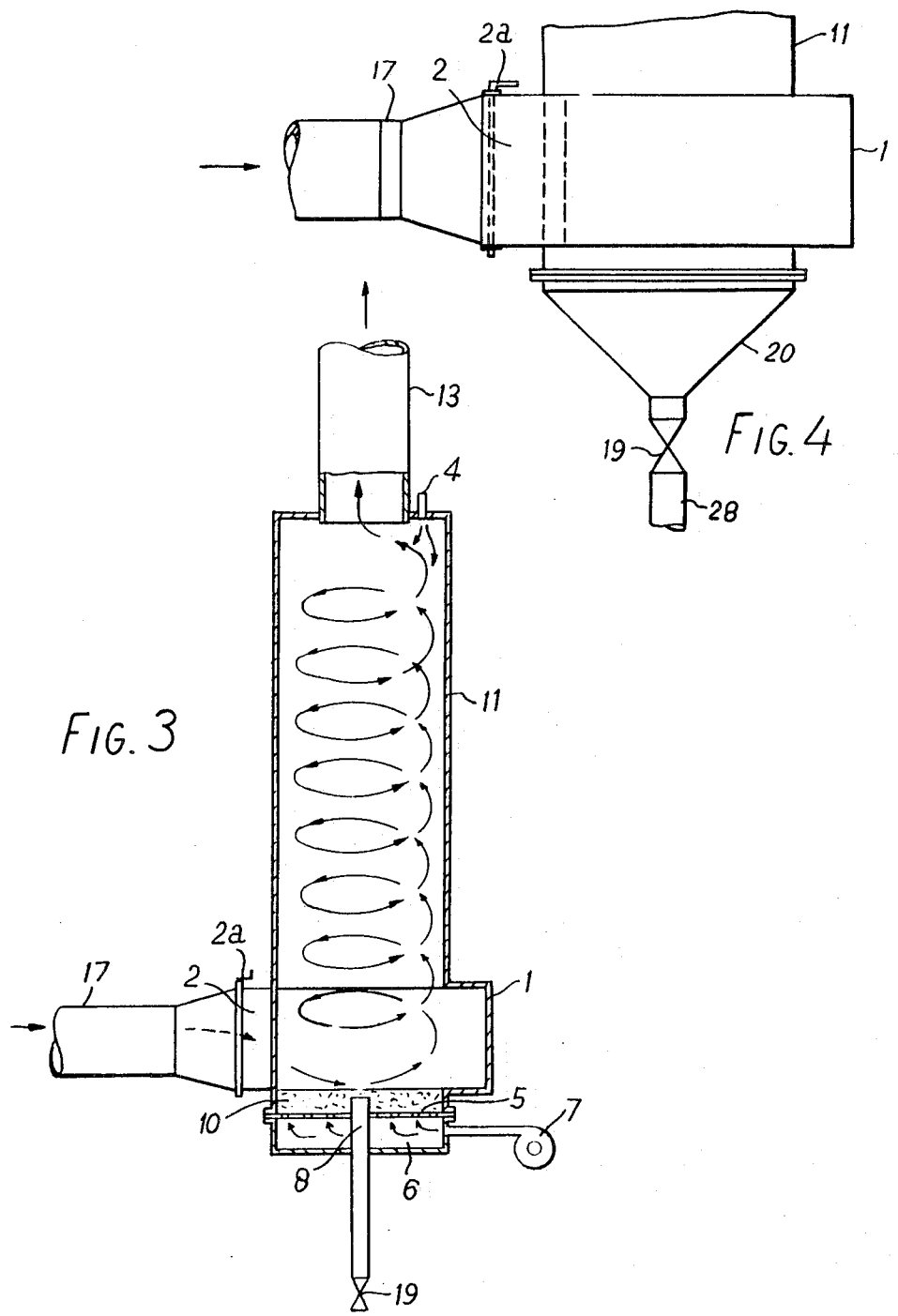

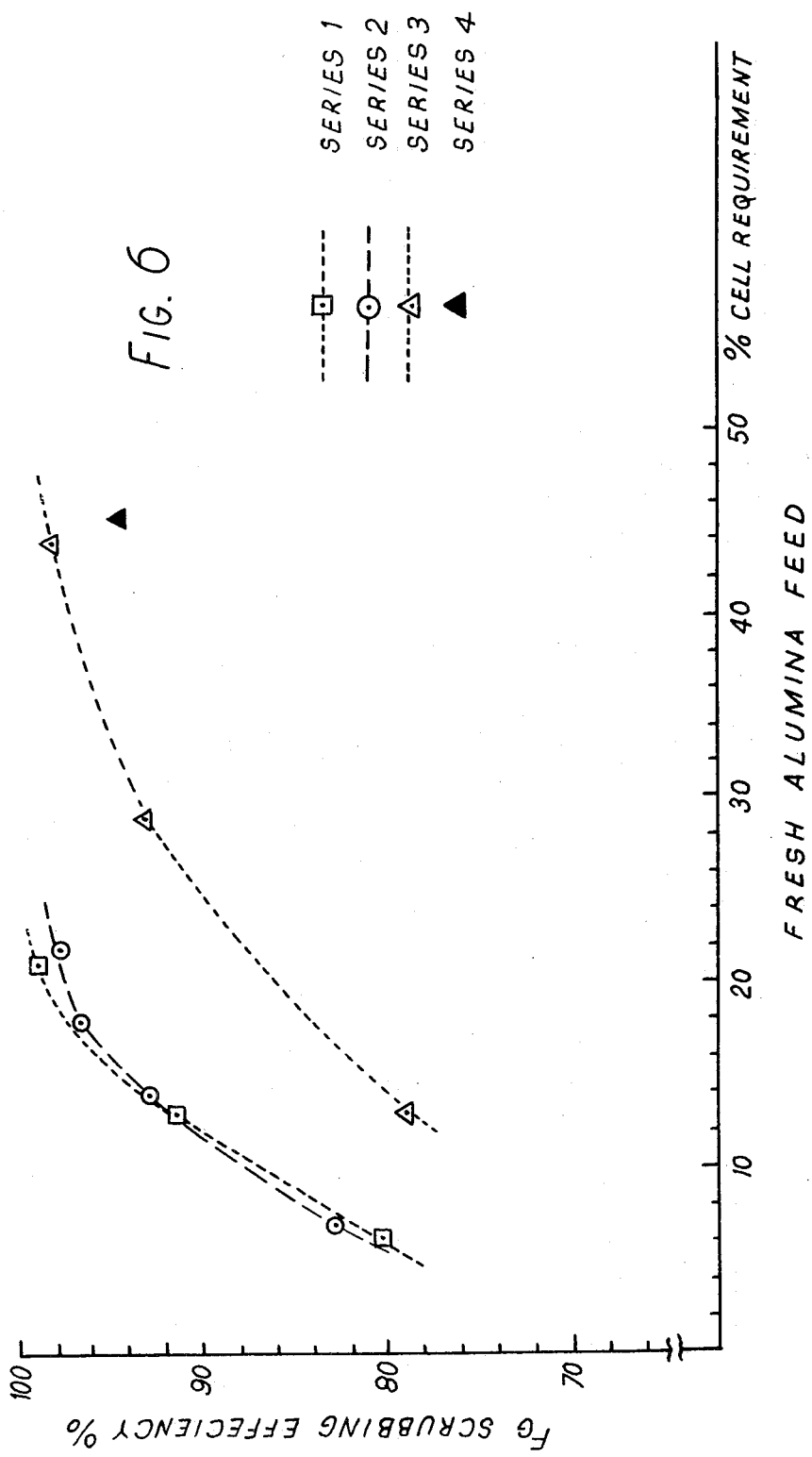

PROCESS AND APPARATUS FOR TREATMENT OF WASTE GASES

The present invention relates to apparatus and methods for removal of reactive gaseous and absorbable vapour contaminants from gas streams by contact with finely divided solid materials, which are capable of sorbing the respective contaminants.

Although the invention may be employed for purposes such as the sorption of obnoxious odour-bearing substances from a gas stream by means of an active carbon, the principal application of the invention is to the removal of hydrogen fluoride (HF) from exhaust gases in any process employing fluorine compounds, such as fluxes in the electrolytic production of aluminium.

Because of its highly toxic characteristics the maximum level of hydrogen fluoride in exhaust gases emitted to the atmosphere is strictly controlled by anti-pollution regulations in almost all industrial countries. Thus in most instances the HF content of exhaust gas must not exceed a value in the range of 2.0–3.0 mg/m$^3$. It is also desirable to recover fluorine compounds for economic reasons, but the avoidance of pollution is today the dominant consideration.

The so-called "dry-scrubbing" of exhaust gases from electrolytic reduction cells (pot) gases by contact with powdered alumina has been widely used to remove hydrogen fluoride and other reactive gaseous components. Dry scrubbing is carried out in a variety of different types of apparatus which involves entraining powdered alumina in the gas stream. Entrained alumina containing the sorbed impurities is subsequently separated from the exhaust gas by suitable means, for example, a bag filter.

In conventional dry scrubbing systems it is usual practice to pass the entire (or large portion of the) alumina requirement of the reduction cells through the dry scrubbing system. This practice of operating the dry scrubber with 100% of cell alumina requirements utilises only a proportion of the total sorptive capacity for hydrogen fluoride of many types of alumina.

Alumina used for dry scrubbing potroom gas picks up other impurities present in the gas, e.g. sulphur dioxide ($SO_2$) and very fine particles of metal compounds and carbonaceous material derived from the anodes. When the scrubber alumina is subsequently fed to the reduction cells, the solid impurities enter the cell and some of these cause a consequent deterioration in purity of the metal produced. Where scrubber feed comprises 100% of cell alumina requirements such impurities are distributed throughout the total quantity of aluminium produced by the potroom.

It is therefore of advantage in aluminium smelter operation to reduce the amount of alumina feed to an associated dry scrubbing system to the lowest level consistent with maintaining the HF content of the discharged gas below the level required by environmental considerations, since this allows a large proportion of the cells to be fed with high purity alumina which has not been contaminated in the scrubber and therefore permits a substantial proportion of the cells to produce Al of a higher purity than under the conventional procedure. The smaller proportion of alumina feed to the scrubber system can be directed to approximately the same proportion of the total number of cells of the potroom and used for production of a lower grade of aluminium in which a higher level of trace impurities can be tolerated.

In addition to fluoride values the alumina feed to the scrubber system sorbs sulphur dioxide which is derived mainly from the sulphur in the cell anodes but also in other raw materials fed to the cell. When alumina containing sorbed sulphur dioxide falls into the molten electrolyte (when breaking the crust on the bath surface) the alumina temperature is raised with the result that sulphur dioxide is evolved which may contaminate the operating environment depending on the type of cell. It would be advantageous to the operating environment around the cells if the total amount of sulphur dioxide returned to the group of cells in a potroom could be reduced. This would be achieved if the amount of sulphur dioxide taken up from the potroom gas in dry scrubbing could be reduced whilst maintaining fluoride scrubbing efficiency at the desired level. We have discovered that a scrubbing process, which requires only a relatively small amount of alumina by reason of the high contact efficiency of the waste gas with the alumina, results in the selective sorption of HF in preference to $SO_2$. This results in a diminution in the amount of $SO_2$ sorbed on the scrubber alumina and returned to the cells. Thus a farther advantage of dry scrubber operation with reduced alumina feed is lower contamination of the potroom operating environment.

Satisfactory operation of a dry scrubber with an alumina feed considerably less than 100% of cell requirements can only be achieved by utilising more fully the sorptive capacity of the alumina for sorption of HF. To achieve this an improvement is required in the efficiency of contact, i.e. time of contact and degree of intermixing of alumina with the pot exhaust gas. Hitherto such improved contact has been achieved either by use of relatively expensive apparatus, such as a fluidised bed, or by simpler procedures, such as feeding alumina at a point where primary gas velocity is greatly increased by e.g. a venturi. None of the simpler expedients has proved wholly satisfactory.

It is an object of the present invention to achieve a gas sorption process which allows the utilisation of a relatively simple apparatus and which, in the case of the sorption of hydrogen fluoride from waste gases, allows effective operation with differing grades of alumina, having differing capacities for sorbing hydrogen fluoride.

In one aspect the present invention resides in a process for sorption of reactive gaseous components from a gas stream which comprises introducing a substantially tangential gas stream at a location adjacent the bottom of a vertical circular-section chamber, removing said gas stream axially at the top of said chamber and continuously introducing a particulate solid sorbent for said components adjacent to the periphery of said chamber and at an upper region thereof. Although in some circumstances the gas velocity may be up to 60 meters/sec. or even higher the gas is preferably introduced into the bottom of the chamber at a velocity in the range of 5–50 meters/sec., and more preferably in the range of 5–20 meters/sec.

As compared with alternative scrubbing procedures, the procedure of the present invention is known to allow increased time of contact to be maintained between the solid particles and the gas stream and this leads to improved efficiency of sorption of hydrogen fluoride.

In this arrangement the gas travelling up the column has a horizontal component of motion and a vertical component of motion. The descending particles follow a somewhat helical path and there is relative motion between the descending particles and the gas stream in both vertical and horizontal directions. This improves the efficiency of contact between the gas and the alumina particles as compared with a system in which the alumina particles are injected into a gas stream in a duct.

In effecting the scrubbing of a gas stream to removed hydrogen fluoride, the alumina feed into the gas stream at the top of the chamber may be wholly fresh alumina or may in part be re-circulated alumina collected from the system. It may however be preferable to rely solely on fresh alumina feed. It may further be preferable to collect a larger fraction at the bottom of the chamber and a separate fraction exiting from the top of the chamber, since the top fraction carries a heavier loading of solid impurities taken from the incoming raw waste gas. A substantial portion of these undesirable contaminants may be removed from the system by treating the top fraction, which forms only a small proportion of the total amount of alumina supplied.

According to another aspect of the invention an apparatus for treatment of a gas stream to sorb unwanted components therefrom comprises an upright cylindrical vessel, a tangential gas inlet at the lower end of said vessel, an axial gas outlet at the upper end of the vessel, a filter collector for separating solid particles from said gas stream arranged above the top or downstream from said vessel and means for introducing particulate solid material into said vessel at the top end thereof adjacent the periphery. Means may be provided for maintaining a bed of solid particles in a fluidised condition at the lower end of the vessel. A tube may be provided to project upwardly from the bottom of the vessel and through a pervious screen constituting the floor for said fluidised bed. This tube may serve as a means for drawing off solid particles from said bed or for introducing a rapidly moving stream of gas directed upwardly on the axis of the vessel to elevate solid particles from the bottom of the vessel to the filter collector above the upper end or downstream from the column.

The object of fluidising the alumina particles in the bottom of the vessel is to keep the alumina in motion so it may re-enter the reaction zone or for ease of removal by either the top or bottom exits.

In order to achieve optimum performance, the ratios of the cross-sectional areas of the inlet and outlet passages to each other and to the cross-sectional area of the reactor vessel are of importance as in standard cyclone theory. It is preferred that the cross-sectional area of the inlet and the cross-sectional area of the outlet should be approximately equal, e.g. 0.8-1.2:1. The diameter of the reactor vessel column may vary between about 1.5-3 times the diameter of the outlet passage, but most preferably is about twice the outlet diameter. The height of the vessel column is important to the achievement of adequate retention time of alumina and should preferably be within the range 3-20 times and more preferably 3-10 times the diameter of the outlet passage to obtain optimum performance. In many cases the cost of the structure may be reduced by employing a much shorter column, i.e. having a height 3-7 times the outlet passage diameter with little sacrifice in performance. As a compromise between cost and optimum performance a vessel column diameter/outlet diameter ratio of 5-6:1 gives good results.

To treat a gas stream of 10,000-20,000 $m^3$/hr. a column diameter of 1-1.5 meters is preferred. The gas exhausted from a group of cells may be as much as 100,000-150,000 $m^3$/hr. and to treat this in a single reactor, a large diameter vessel is necessary for the reaction column.

Any type of filter collector may be used at the top of the column or downstream from it but the pulsed bag type is normally preferred for collecting alumina in dry scrubbing installations.

The filter collector may be located directly above the column, in which case the material caught in the filter is preferably collected into a collecting space surrounding the outlet passage from the column and means are preferably provided for maintaining the material in the collecting space in a fluidised condition. Take-off conduits permit this collected material to be withdrawn from the system or recycled to the top of the column.

According to a further feature of the invention there is provided a method of operating a group of electrolytic cells for the electrolytic production of aluminium by passage of electric current between an anode and a cathode in electrical contact with a molten bath of a fluoride-containing flux in which alumina is dissolved, including drawing off a waste gas stream from said group of cells and passing said waste gas stream to a scrubbing system for removal of gaseous fluoride values therefrom, said system including one or more treatment chambers, the improvement which comprises supplying the waste gas stream to the lower end of an upright cylindrical chamber, allowing said gas stream to ascend such chamber and removing said gas stream from the upper end of said chamber, continuously introducing particulate alumina material into the upper end of said chamber and allowing said material to descend in counter current flow to said ascending gas to sorb gaseous fluoride components of said gas, collecting said alumina material from the or each treatment chamber and supplying said collected alumina to a part of said group of cells and supplying fresh alumina to the remainder of the group of cells.

The contact of an ascending gas stream with a descending flow of particulate alumina leads to a more efficient gas/alumina contact with improved sorption of contaminants in the gas stream. It is preferred that this contact should be effected while the gas follows an upward helical path.

Apparatus for carrying out the procedure of the invention will be described below in more detail with reference to the drawings, in which:

FIG. 3 is a diagrammatic vertical section of a different form of apparatus;

FIG. 4 is a view of a modified form of the lower part of the apparatus of FIG. 3;

FIG. 6 is a graphical representation of the results of Examples 1 and 2.

Figures 1, 2:
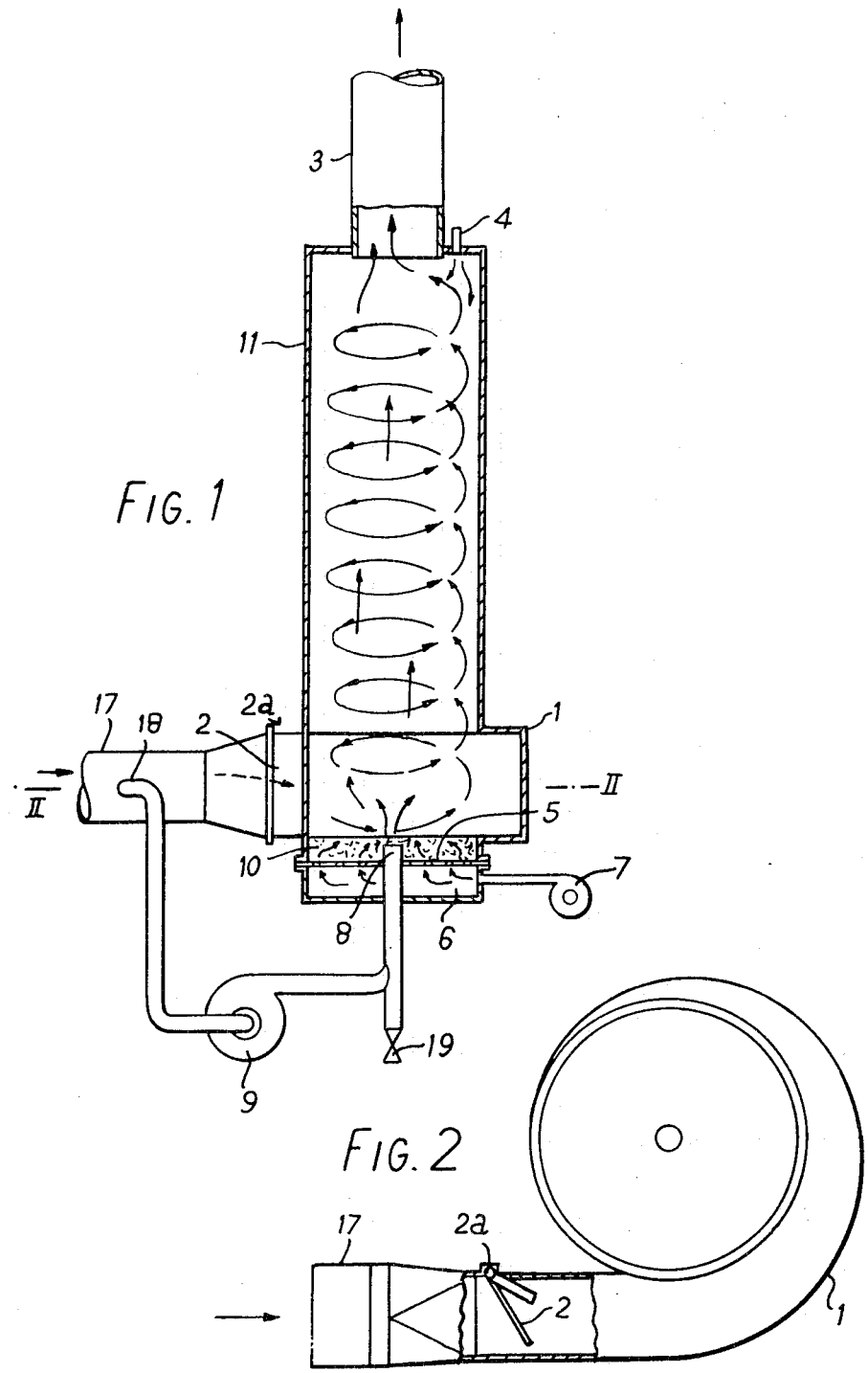
FIG. 1 shows in diagram form a vertical section through one form of apparatus.
FIG. 2 is a horizontal section along line II—II of FIGS. 1 and 5.

As may be seen in FIG. 1, the main body of the reactor within which sorption takes place consists of a vertical cylindrical chamber 11. At the bottom end, the chamber 11 has a spiral manifold 1 which has an inlet 17 for the raw waste gas to be scrubbed by contact with particulate solid material, for example, aluminium reduction cell exhaust gas containing hydrogen fluoride to be contacted with particulate alumina. The spiral manifold 1 serves to introduce the gas tangentially into the lower end of the chamber 11. At the entrance to the spiral manifold 1 (which is rectangular in section as shown in FIG. 2) an angularly adjustable plate 2 is provided. This serves to regulate the velocity of the gas injected into the lower end of the chamber. This plate 2 is adjusted by means of a control device 2a, for example, a manually operated wheel. It will be understood that as the angular position of the plate is changed, the velocity of the gas passing between the plate 2 and the outer periphery of the manifold 1 will change. For the efficient operation of the apparatus the speed of the gas stream at this locality preferably lies between 5 and 50 meters/sec. and more preferably in the range 5–20 meters/sec. It is of great importance to inject the gas at a suitable speed in order to achieve an expedient gas flow pattern in the chamber.

Figure 5:
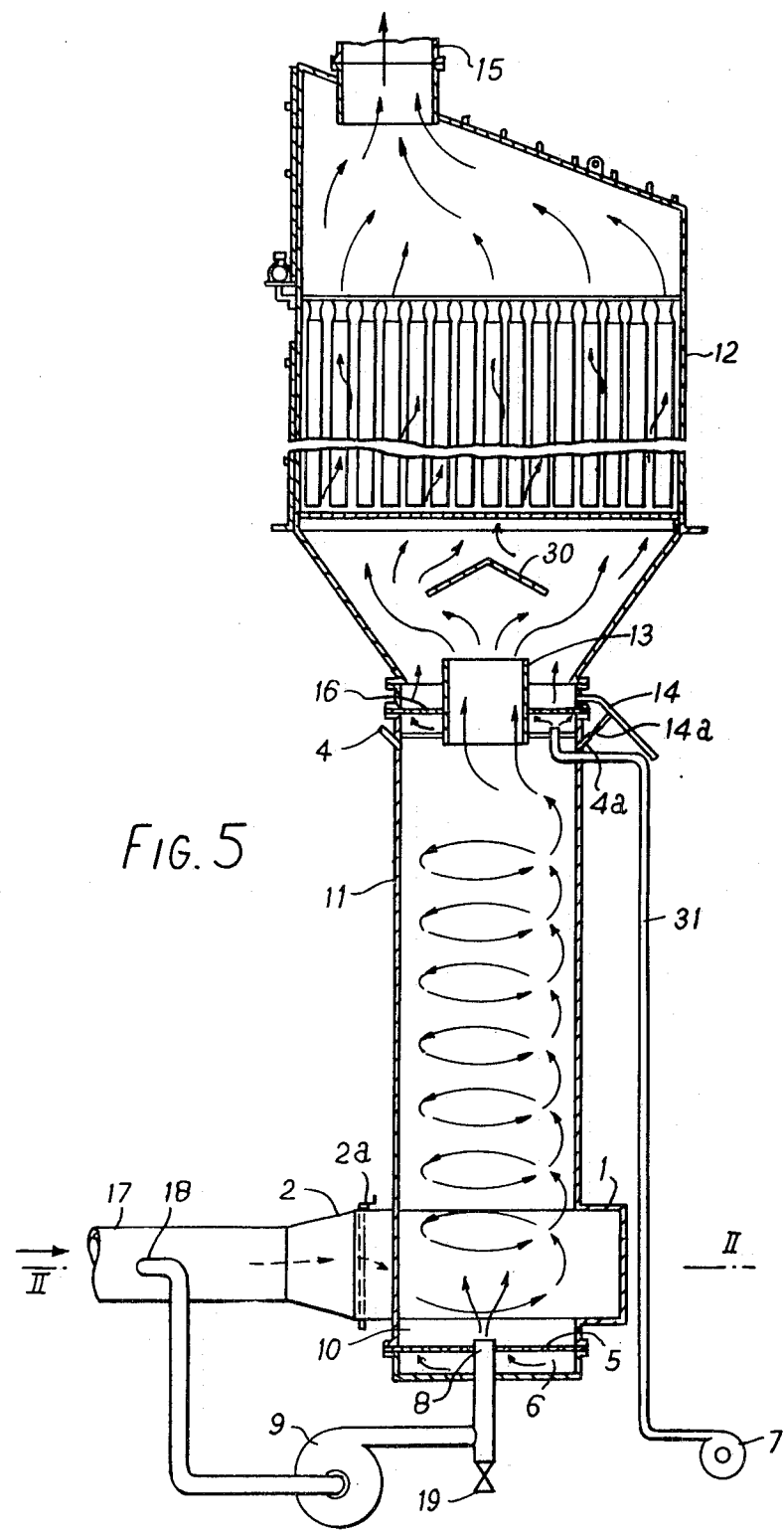
FIG. 5 is a diagrammatic vertical section of the same form of apparatus as that of FIG. 1, but with the filter collector located directly above the reactor column.

In the apparatus of FIG. 1 an axial gas outlet 3 is provided at the top of column 11 to conduct the gas to any suitable form of filter. In the apparatus of FIG. 5 an axial gas outlet 13 is provided and this leads to a bag filter apparatus 12 for removal of any entrained fine particles. The filter shown in FIG. 5 is of the well-known pulsed type so that particles collected on the filter sleeves are periodically shaken off and returned to the bottom of the filter chamber.

The solid particulate sorbent, for example alumina, is introduced into chamber 11 as a continuous or intermittent stream through one or more feed inlets 4 arranged to introduce the solid material into the helically moving gas stream near the periphery of the chamber. Where HF is being sorbed, the sorbent may consist wholly or in part of fresh alumina. Alternatively, part of the alumina may be constituted by material recirculated from the lower part of filter 12 via a feed inlet 4a (FIG. 5). The feed inlet or inlets 4, 4a may be arranged at or near the periphery of the chamber 11 or may be arranged so as to project the sorbent material outwardly towards the peripheral wall of the chamber 11.

The coarser solid particles gradually descend to the bottom of the chamber through the rising helical gas stream and are collected on an air-permeable screen 5, disposed over an air space 6 to which air is supplied by means of a fan 7. The air rising through the screens 5 serves to maintain the particles in a fluidised condition in the bed 10. The depth of the bed 10 is typically maintained at about 200 mm.

An axial tube 8 extends upwardly through the bottom of the apparatus. The upper end of the tube projects slightly above the level of the screen 5 into the region occupied by the fluidised bed 10. The function of the tube 8 is to remove alumina (or other sorbent) which has collected in the fluidised bed 10 at the bottom of the chamber. The tube 8 may be employed in more than one way. It may be used to discharge collected alumina through a conventional gate 19. Alternatively it may be employed to transport the collected alumina upwardly and out through the gas outlet, as illustrated in FIGS. 1 and 5. In FIG. 5 the solid material from the fluidised bed 10 is collected in the bag filter 12, to which it is transported by gas or air entering via blower 9. It will be understood that in the chamber 11 in operation there is a rapid helical gas stream in the region of the periphery of the chamber, but in the axial region of the chamber (with blower 9 in operation) there is a fast moving axially-directed upward stream of gas. For this purpose a stream of gas is drawn off from the inlet conduit 17 through a pipe 18 by a blower 9. Alternatively the blower 9 may draw air from atmosphere for this purpose. The alumina collected in the fluidised bed 10 is transported upwards to the filter unit 12 by entrainment in the latter stream.

The axial gas or air stream from blower 9 may be continuous or intermittent. On entering the filter chamber 12 in FIG. 5, the stream strikes an inverted deflector cone 30, which knocks down the heavier particles and also serves to prevent particles from the filter bag falling back into the chamber 11 through the outlet 13.

When the filter is located above the column, as in FIG. 5, the alumina collected in the bottom of the filter chamber 12 is maintained in a fluidised condition by air supplied to a space between the top of the chamber 11 and a screen 16. The supply of air to this space is via a pipe 31 from blower 7. Alumina may be drawn off from this fluidised bed via conduit 14. Part of the alumina so withdrawn may be returned to chamber 11 via the inlet 4a already mentioned by operation of a valve 14a.

The waste gas is drawn through the scrubbing system of FIG. 5 by a blower (not shown) which is located downstream of the outlet 15 for the filter housing, the blower forwarding the remainder of the waste gas to a stack for discharge to atmosphere.

In the apparatus as described contact between the particulate alumina and the gas is effected in two separate ways. Firstly there is contact between the swirling, rising current of gas with the alumina particles fed in at the top of chamber 11 through feed inlets 4, 4a. Secondly there is contact of the gas entering the chamber from the spiral manifold 1 with the alumina particles in the fluidised bed 10.

The apparatus shown in FIG. 3 can be regarded as a somewhat simplified form of the reactor apparatus shown in FIG. 1. The same parts are identified by the same numerals as in FIG. 1. The difference between the embodiment shown in FIG. 1 and that of FIG. 3 is that in FIG. 3 the alumina collecting in the bottom of the chamber is always drawn off through tube 8. A small fraction of the sorbent is carried out through outlet 13 at the top of chamber 11 and is collected in a filter above or downstream from the reactor chamber. In this apparatus the alumina added may be fresh or recycled alumina and the collected small fraction is preferably subjected to separate treatment for removal of contaminants therefrom. This arrangement is preferred for electrolytic cells equipped with Soderberg anodes, because the pitch or tar particles from these are largely collected with the small fraction.

FIG. 4 shows a further alternative embodiment for the lower part of a reactor chamber. In this alternative there is no fluidised bed at the bottom of the chamber. Instead the alumina is collected in a conical hopper 20, from which the alumina is drawn off through a tube 28 by means of gate 19.

The apparatus of the present invention is effective for the sorption of hydrogen fluoride from electrolytic cell waste gas by the use of a wide range of aluminas, for example with alumina having a specific surface area of 80–90 $m^2/g$ or higher and alumina having a lower specific surface area of 40 $m^2/g$ or less and also aluminas having a specific surface area between the above.

Examples of tests of the operation of the apparatus according to the invention are as follows.

EXAMPLE 1

Exhaust gas containing approximately 45-60 mg gaseous fluoride per $Nm^3$ from a potroom having a number of aluminium reduction cells equipped with prebaked-type electrodes was introduced into the apparatus according to the embodiment of FIG. 1 via the inlet conduit 17 at flow rates within the range 13,500-15,000 $Nm^3/h$. The ratio of the cross-sectional areas of the column and the gas outlet was 1:1 and the ratio of the column height to gas outlet chamber was 5.5:1. The inlet gas velocities measured adjacent to the valve plate 2 were within the range 12-20 m/s. For convenience the latter embodiment is referred to henceforth as a reactor with top exit of alumina, since all collected alumina was discharged via that route. Fresh alumina of a type having a high sorptive capacity for hydrogen fluoride and having a surface area within the range 80-90 $m^2/g$ was introduced to the apparatus at four different controlled feed rates through the feed inlet 4. For convenience the above alumina is referred to henceforth as Alumina type 1.

Simultaneous samples of the gas were withdrawn from the inlet conduit to the reactor and the outlet conduit from the pulsed bag filter downstream from the reactor for 3 hour test periods and analysed for gaseous F content according to procedures well known in the art.

For each test condition, Table 1, shows the number of tests made, alumina feed rate used, gaseous F contents of the gas, and efficiencies of gaseous fluoride removal by the scrubbing system. This series of tests is designated in Table 1 as Test Series 1.

It can be seen that with Alumina Type 1 under these test conditions the gaseous F scrubbing efficiency of the system was in excess of 90% even when the fresh alumina feed rate was reduced to 14% of cell requirements.

EXAMPLE 2

A series of tests similar to those of Example 1 was made with the same Alumina Type 1 in the same apparatus but with the apparatus operated according to the embodiment of FIG. 3. The gas inlet velocity was the same as in Example 1. For convenience the latter embodiment is referred to henceforth as the reactor with bottom exit of alumina. The test conditions and results of this series of tests are also presented in Table 1, designated Test Series 2. In Test Series 2 the alumina collected separately by the bag filter formed about 20-30% of the alumina supplied to the dry scrubber system.

To enable comparison of the various embodiments of the apparatus of the invention with prior art processes, Table 1 also presents results of two further test series also using Alumina Type 1. In both series the apparatus of the invention was not used; the alumina was injected directly into the potroom exhaust gas duct upstream from a conventional bag filter. In this comparative test the residence time of the alumina in the gas stream between the point of injection and collection in the bag filter was approximately 0.5 to 1.0 second. This is typical of contact times in similar full scale operations. In Test Series 3 alumina collected in the bag filter was recycled to the fresh alumina injection point at a rate of approximately 250 kg/h/cell, equivalent to approximately 300% of cell fresh alumina requirements. In Test Series 4, no such recycle was used.

The variation of HF scrubbing efficiency with fresh alumina feed rates for the four test series reported in Table 1 is presented in graphical form in FIG. 6. Trend lines have been drawn through the points on the graph representing each test series. The graph shows that significantly more scrubbing of gaseous HF is effected for a given supply rate of fresh alumina with the apparatus than without.

From Example 2 it is estimated that feeding Alumina 1 at a rate of 20% of total potroom requirements to the reactor will maintain the HF content of clean gas at environmentally acceptable levels. This applies to all levels of HF to be expected in gas from a cell equipped with prebake electrodes. This allows 80% of the cells in the potroom to be fed with alumina which has not passed through the scrubber system.

From this it will be seen that the alumina collected in the bag filter system and subjected to optional treatment for impurity removal consist of only about 4-6% of the total alumina requirements of the potroom.

It can be seen from FIG. 6 that the scrubbing efficiency of the reactor using top exit of alumina and bottom exit of alumina is virtually the same.

In most instances it will be preferred to operate the reactor with top exit of alumina, because of greater simplicity in subsequent feeding of the alumina to the cells in the potroom. The bottom exit system is preferred however where it is desired to treat the alumina fraction leaving the top for contaminant removal. This system will be preferred in most instances where the cells are equipped with Vertical Stud Soderberg anodes.

EXAMPLE 3

Alumina Type 2 having a slightly lower sorptive capacity for hydrogen fluoride than Alumina Type 1 and having a surface area within the range 70-80 $m^2/g$ was introduced to the reactor with bottom exit of alumina. The operating parameters of gas inlet velocity and total gas flow rate were the same as in Examples 1 and 2. Sampling and analyses were carried out in a manner identical with that of the preceding Examples, and test conditions and results are presented in Table 2, in which this series of tests is designated Test Series 5.

For comparison with prior art processes, Alumina 2 was tested under the same conditions as in the Test Series 3 and 4. These comparative tests are designated Test Series 6 and 7 in Table 2.

From comparison of the HF scrubbing efficiency of the results of Test Series 5 with the results of Series 6 and 7 it is evident that use of the apparatus of the invention has enabled significantly more scrubbing of HF to be effected by Alumina Type 2 for a given alumina utilisation rate.

EXAMPLE 4

Alumina Type 3 having a considerably lower sorptive capacity for hydrogen fluoride than Aluminas Type 1 and 2 and having a surface area within the range 50-60 $m^2/g$ was introduced to the reactor with top exit of alumina. The gas flow rate and inlet velocity was the same as in Examples 1 and 2. Sampling and analyses were carried out in a manner identical with that of the preceding Examples, and test conditions and results are presented in Table 3, in which the series of tests is designated Test Series 8 and compared with Test Series 9 and 10 obtained under conditions comparable to Test Series 3 and 4.

From examination of Table 3 it is evident that use of the apparatus of the invention has enabled significantly more scrubbing of gaseous F to be effected by Alumina Type 3 for a given utilisation rate than in the Test Series 9 and 10. However, less scrubbing is effected by a given utilisation rate of Alumina Type 3 in a given scrubbing system than by use of the same utilisation rates of Aluminas Type 1 and 2 because of the lower sorptive capacity for gaseous fluoride of the former, i.e. this alumina is closer to saturation by sorbed HF than Aluminas 1 or 2.

ing a stream of gas substantially tangentially at the lower end of the vessel, an axial gas outlet passage leading out of the upper end of the vessel, means for introducing said particulate material into said vessel at or near the top end thereof for downward flow in proximity to the vessel periphery and a filter collector for particulate material at the top of the vessel or downstream of said gas outlet to collect particulate material from gas issuing through said outlet.

TABLE 1

| | | | Alumina Type 1 | | | | | |
|---|---|---|---|---|---|---|---|---|
| | | | Alumina Feed Rate | | Primary Gas | | Clean Gas | | Gaseous F |
| Test Indent | Conditions | No. of Tests | % cell requirements | g/Nm³ primary gas | mg/Nm³ F | g/hr/cell F | mg/Nm³ F | g/hr/cell F | Scrubbing Effy % |
| Series 1 Example 1 | Reactor Top Exit | 9 | 22 | 2.40 | 55.6 | 402.5 | 1.03 | 8.8 | 97.8 |
| | | 3 | 18 | 1.96 | 55.3 | 402.2 | 1.53 | 12.9 | 96.8 |
| | | 4 | 14 | 1.44 | 44.4 | 335.4 | 2.82 | 24.3 | 92.8 |
| | | 6 | 7 | 0.75 | 61.7 | 458.2 | 9.19 | 79.5 | 82.7 |
| Series 2 Example 2 | Reactor Bottom Exit | 3 | 21 | 2.20 | 32.8 | 243.1 | 0.34 | 2.81 | 98.8 |
| | | 6 | 13 | 1.37 | 28.7 | 213.2 | 1.10 | 18.2 | 91.5 |
| | | 2 | 6 | 0.64 | 23.8 | 177.2 | 4.27 | 35.5 | 80.0 |
| Series 3 Example 2 | Recycle | 3 | 44 | 4.65 | 45.6 | 339.6 | 0.72 | 6.0 | 98.2 |
| | | 6 | 29 | 3.36 | 54.9 | 376.2 | 3.28 | 25.8 | 93.1 |
| | | 10 | 13 | 1.37 | 53.6 | 386.2 | 9.61 | 81.5 | 78.9 |
| Series 4 Example 2 | No Recycle No Reactor | 3 | 45 | 5.23 | 60.2 | 408.7 | 2.80 | 22.3 | 94.6 |

TABLE 2

| | | | Alumina Type 2 | | | | | |
|---|---|---|---|---|---|---|---|---|
| | | | Alumina Feed Rate | | Primary Gas | | Clean Gas | | Gaseous F |
| Test Indent | Conditions | No. of Tests | % cell requirements | g/Nm³ primary gas | mg/Nm³ F | g/hr/cell F | mg/Nm³ F | g/hr/cell F | Scrubbing Effy % |
| Series 5 Example 3 | Reactor Bottom Exit | 17 | 23 | 2.64 | 32.7 | 223.1 | 0.47 | 3.7 | 98.3 |
| | | 3 | 19 | 2.18 | 37.0 | 254.9 | 1.66 | 13.3 | 94.8 |
| | | 3 | 16 | 1.76 | 33.5 | 240.2 | 0.86 | 7.2 | 97.0 |
| | | 6 | 13 | 1.45 | 28.7 | 201.8 | 1.02 | 8.3 | 95.9 |
| | | 12 | 9.5 | 1.04 | 32.8 | 236.7 | 4.85 | 40.3 | 83.0 |
| | | 6 | 6 | 0.68 | 36.5 | 257.6 | 8.13 | 66.7 | 74.1 |
| Series 6 Example 3 | Recycle | 18 | 40 | 4.53 | 38.0 | 263.5 | 0.69 | 5.5 | 97.9 |
| | | 6 | 29 | 3.32 | 40.1 | 273.0 | 2.07 | 16.4 | 94.0 |
| | | 6 | 17 | 1.90 | 49.1 | 342.3 | 7.72 | 61.7 | 82.0 |
| | | 10 | 15.5 | 1.76 | 54.7 | 380.8 | 6.93 | 55.3 | 85.5 |
| Series 7 Example 3 | No Reactor No Recycle | 6 | 40.5 | 4.46 | 46.5 | 330.6 | 5.08 | 42.6 | 87.1 |

TABLE 3

| | | | Alumina Type 3 | | | | | |
|---|---|---|---|---|---|---|---|---|
| | | | Alumina Feed Rate | | Primary Gas | | Clean Gas | | Gaseous F |
| Test Indent | Test Conditions | No. of Tests | % cell requirements | g/Nm³ primary gas | mg/Nm³ F | g/hr/cell F | mg/Nm³ F | g/hr/cell F | Scrubbing Effy % |
| Series 8 Example 4 | Reactor Top Exit | 6 | 28 | 3.07 | 48.5 | 351.0 | 0.62 | 5.2 | 98.5 |
| | | 3 | 23.5 | 2.66 | 52.6 | 363.5 | 1.85 | 15.3 | 95.8 |
| | | 3 | 15 | 1.59 | 44.6 | 328.4 | 6.60 | 56.6 | 82.8 |
| | | 3 | 10 | 1.10 | 52.8 | 367.3 | 13.05 | 106.3 | 71.1 |
| Series 9 Example 4 | Recycle | 3 | 52 | 5.65 | 54.1 | 387.6 | 1.43 | 12.2 | 96.9 |
| | | 3 | 40 | 4.79 | 59.3 | 389.8 | 2.97 | 23.8 | 93.9 |
| | | 6 | 29 | 3.23 | 59.1 | 417.8 | 4.15 | 34.7 | 91.7 |
| Series 10 Example 4 | No Recycle No Reactor | 3 | 51.5 | 5.81 | 38.7 | 268.6 | 1.14 | 9.1 | 96.6 |

I claim:

1. Apparatus comprising an upright cylindrical vessel for the treatment of a gas stream to sorb components therefrom by contact with a particulate material which sorbs said components, a gas inlet passage for introduc- 2. Apparatus according to claim 1 further including a pervious floor below the gas inlet passage for said gas stream, an air space below said floor and means for supplying air to said air space for maintaining particulate material, supported by said pervious floor, in a fluidised condition.

3. Apparatus according to claim 2 further including an axially arranged tube having an upper end projecting slightly above said pervious floor and positioned to be submerged by particulate material supported by said floor.

4. Apparatus according to claim 3 further including means for supplying gas to said tube to establish an upward axial gas flow in said upright cylindrical vessel.

5. Apparatus according to claim 3 further including an axial particulate material outlet pipe at the bottom of said vessel and a valve controlling the release of particulate material therethrough.

6. Apparatus according to claim 1 further including a conical bottom for said cylindrical vessel to collect particulate material.

7. Apparatus according to claim 1 comprising control means in the gas inlet passage to said cylindrical vessel to control the inlet gas velocity to a desired value.

8. Apparatus according to claim 1 in which the diameter of the cylindrical vessel is 1.5–3 times the diameter of the gas outlet passage.

9. Apparatus according to claim 1 in which the height of the cylindrical vessel is 3–20 times the diameter of the gas outlet passage.

10. Apparatus according to claim 1 in which the cross-sectional area of the gas inlet passage is 0.8–1.2 times the cross-sectional area of the gas outlet passage.

11. Apparatus according to claim 1 further including a filter chamber arranged over the cylindrical vessel and having a particulate-material collecting space arranged around the gas outlet passage.

12. Apparatus according to claim 11 further including means for maintaining particulate material in a fluidised condition in said collecting space.

13. Apparatus according to claim 11 further including means for recirculating particulate material from said collecting space to the upper end of said cylindrical vessel.

14. A process for sorption of sorable components from a gas stream which comprises introducing a substantially tangential gas stream at a location adjacent to the bottom of a vertical elongated circular-section chamber at a velocity in the range of 5–50 meters/sec., removing the gas stream axially at the top end of said chamber and continuously introducing particulate solid sorbent for said sorbable components into a zone of said chamber lying adjacent to the periphery of said chamber and at the upper end thereof.

15. A process according to claim 14 in which the inlet velocity of said gas stream is in the range of 5–20 meters/sec.

16. A process according to claim 14 further including maintaining a fluidised layer of said particulate solid sorbent at the bottom of said chamber to facilitate removal of said solid sorbent from top or bottom of said cylindrical chamber.

17. A process according to claim 16 further including directing a gas stream upwardly axially from an axial air inlet adjacent the lower end of said chamber.

18. A process according to claim 14 further including collecting a major fraction of the particulate material at the bottom of said chamber and carrying out a minor fraction of said particulate material through said axial outlet at the top of said chamber and recovering said minor fraction at a filter means.

19. A process according to claim 18 further including separately treating said minor fraction to remove sorbed inpurity material therefrom.

20. A process according to claim 14 in which said gas stream constitutes the waste gas from the whole of a group of electrolytic cells for the production of aluminium and the particulate sorbent is alumina in an amount substantially less than the total amount of alumina required for the operation of said group of cells.

21. A process according to claim 20 in which said alumina, after separation from said gas stream, is supplied to only a part of said group of cells.

22. A process for sorption of reactive gaseous components from a gas stream which comprises introducing a substantially tangential gas stream at the bottom of a vertical cylindrical chamber at a velocity of 5–50 meters/sec., continuously introducing particulate solid sorbent for said gaseous components into a zone of said chamber lying adjacent to the periphery of said chamber and at the upper end thereof, and removing the gas stream axially at the top end of said chamber through a circular outflow passage, the diameter of said chamber being 1.5–3 times the diameter of said outflow passage.

23. A process according to claim 22 in which the height of said cylindrical chamber lies within the range of 3–20 times the diameter of said outflow passage.

24. In a method of operating a group of electrolytic cells for the electrolytic production of aluminium by passage of electric current between an anode and a cathode in electrical contact with a molten bath of a fluoride-containing flux in which alumina is dissolved, including drawing off a waste gas stream from said group of cells and passing said waste gas stream to a scrubbing system for removal of gaseous fluoride values therefrom, said system including one or more treatment chambers, the improvement which comprises diminution of gaseous fluoride components from said waste gas stream by treatment of said waste gas with a flow of particulate alumina in an amount substantially less than the total requirements of the group of cells by causing said waste gas stream to follow an upward helical path in said treatment chamber or chambers, introducing a flow of particulate alumina into said helical path, allowing said alumina to descend through said gas stream travelling in said helical path, collecting said alumina after contact with said gas in said helical path, supplying said collected alumina to a part of said group of cells and supplying fresh alumina to the remainder of said cells.

25. In the method of claim 24 the further improvement which comprises filtering off an alumina fraction from said gas after leaving said helical path and separately treating said filtered fraction for removal of sorbed contaminants before supplying said alumina to cells of said group of cells.

* * * * *